(12) United States Patent
Suzuki

(10) Patent No.: US 8,171,024 B2
(45) Date of Patent: May 1, 2012

(54) JOB LOG PROCESSING APPARATUS AND COMPUTER-READABLE MEDIUM

(75) Inventor: Tatsuya Suzuki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 280 days.

(21) Appl. No.: 12/562,377

(22) Filed: Sep. 18, 2009

(65) Prior Publication Data

US 2010/0121822 A1    May 13, 2010

(30) Foreign Application Priority Data

Nov. 13, 2008    (JP) ................................ 2008-290832

(51) Int. Cl.
*G06F 7/00* (2006.01)
(52) U.S. Cl. ...................................................... 707/736
(58) Field of Classification Search .................. 707/736, 707/E17.005, E17.01, E17.044, 999.107
See application file for complete search history.

(56) References Cited

U.S. PATENT DOCUMENTS

| | | | | |
|---|---|---|---|---|
| 2002/0140970 A1* | 10/2002 | Kato et al. | ................... | 358/1.15 |
| 2005/0216514 A1* | 9/2005 | Murata | ..................... | 707/104.1 |
| 2006/0235896 A1* | 10/2006 | Matoba | ........................ | 707/200 |
| 2008/0005176 A1* | 1/2008 | Shimizu | ..................... | 707/104.1 |
| 2008/0120340 A1* | 5/2008 | Hashimoto | ................ | 707/104.1 |
| 2009/0222484 A1* | 9/2009 | Nordhielm et al. | ........ | 707/104.1 |

FOREIGN PATENT DOCUMENTS

| | | |
|---|---|---|
| JP | 2004-318701 A | 11/2004 |
| JP | 2005-271317 A | 10/2005 |

* cited by examiner

*Primary Examiner* — John E Breene
*Assistant Examiner* — Randall Burns
(74) *Attorney, Agent, or Firm* — Sughrue Mion, PLLC

(57) ABSTRACT

A job log collection unit cooperates with job log management programs of copying machines to collect job logs held in the copying machines and store the collected job logs in a job log storage unit. A user change history creation unit refers to a human resource database to thereby determine whether a section which each user belongs to has been changed or not in a range of newly collected job logs. The user change history creation unit creates a user change history for each user who has encountered the change and stores the user change history in a user change history storage unit. A job log aggregation unit classifies the job logs of the job log storage unit into user sections by referring to the user change history of the user change history storage unit and aggregates the job logs in accordance with each section.

15 Claims, 19 Drawing Sheets

SPECIFIC EXAMPLE OF OPERATION

EXAMPLE OF AGGREGATION PROCESS
ACCORDING TO THE RELATED ART

EXAMPLE OF OPERATION ACCORDING TO THE EMBODIMENT

FLOW OF CHANGE HISTORY CREATION PROCESSING

FLOW OF SECTION-BASED REPORT CREATION PROCESSING

HUMAN RESOURCE DATABASE UPDATE OPERATION

EXAMPLE OF CHANGE HISTORY

EXAMPLE OF CREATION OF CHANGE HISTORY FILE

FIG. 10

PERSON A

| DATE OF CHANGE | SECTION OF CHANGE |
|---|---|
| 2006/4/1 | SECTION O |
| 2008/4/1 | SECTION P |
| 2008/6/1 | SECTION R |

*FIG. 11*

PERSON B

| DATE OF CHANGE | SECTION OF CHANGE |
|---|---|
| 2007/4/1 | SECTION O |
| 2008/4/1 | SECTION P |
| 2008/5/1 | SECTION Q |
| 2008/6/1 | SECTION R |

FIG. 12

CHANGE HISTORY FILE

| USER | DATE OF ADDITION | NAME OF SECTION |
|---|---|---|
| A | 2008/3/15 | SECTION O |
| A | 2008/4/10 | SECTION P |
| B | 2008/4/20 | SECTION P |
| B | 2008/6/15 | SECTION R |
| A | 2008/7/10 | SECTION R |

REPORT FILE CREATION PROCESSING IN ACCORDANCE WITH EACH SECTION AND EACH DATE

REPORT FILE CREATION PROCESSING IN ACCORDANCE WITH EACH UPPER SECTION

FLOW OF ORGANIZATIONAL CHANGE HISTORY CREATION PROCESSING

FLOW OF UPPER SECTION-BASED REPORT CREATION PROCESSING

FIG. 17 MODIFICATION OF THE EMBODIMENT

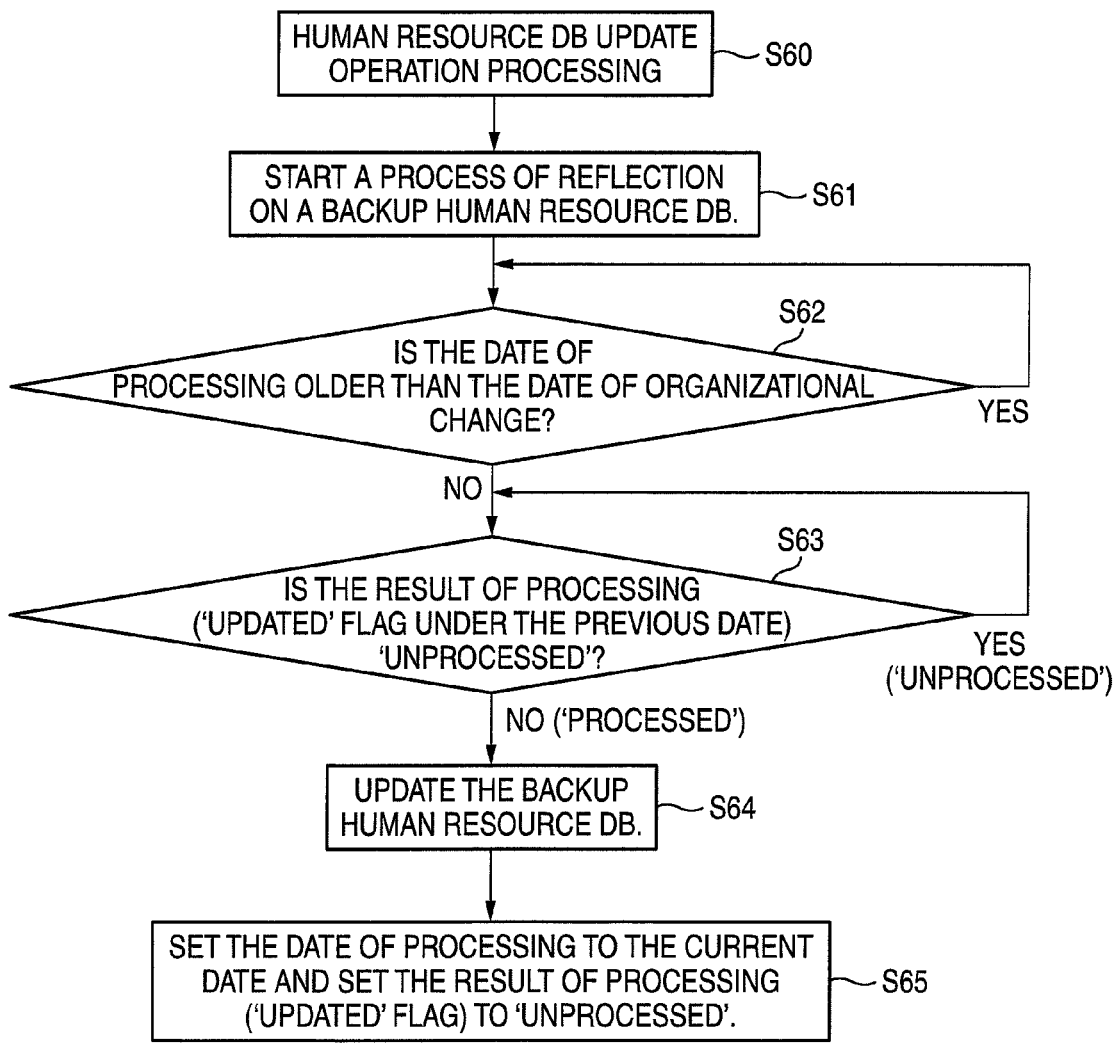

JOB LOG PROCESSING APPARATUS AND COMPUTER-READABLE MEDIUM

CROSS-REFERENCE TO RELATED APPLICATION

This application is based on and claims priority under 35 USC 119 from Japanese Patent Application No. 2008-290832 filed on Nov. 13, 2008.

BACKGROUND

1. Technical Field

The present invention relates to a job log processing apparatus and a computer-readable medium.

2. Related Art

A method of aggregating job logs and managing the total amounts of accounting units in accordance with users or sections has been applied to copying machines, printers, etc. For example, as shown in FIG. 1, an aggregation service S1 executed under an administrator's computer environment or the like collects job log files F from respective devices (such as copying machines, printers, etc.) through a communication network and creates section-based management tables R from the job log files F by looking up user information T as a table. In this example, the target of aggregation is the number of pages of each copying machine or the like. Incidentally, to perform such an aggregation operation, fixed correspondence between users and sections was referred to because a human resource database accurately including information of change was not allowed to be directly referred to from the viewpoint of management of confidential information, etc. This correspondence is updated monthly, quarterly or yearly. For this reason, section-based aggregation cannot be performed accurately in an environment in which organizational change is made frequently. That is, in the example shown in FIG. 1, even when organizational change was made in an aggregation period, the section to which a certain user belongs is either of a section before the change and a section after the change (or an intermediate section if change was made several times) because the user must belong to only one section. When information in the user information file is latest information (information after change), job logs are not aggregated in the section before change but always aggregated in the latest section even in the case where the user encountered section change in the aggregation period. Or, if the information in the user information file is old at the time of performing an aggregation operation, job logs which should be aggregated in the section after change would be aggregated in the section before change.

SUMMARY

According to an aspect of the invention, a job log processing apparatus includes a collection unit, a job log storage unit, a section information storage unit, an update unit, a record creation unit, a change history record storage unit, an association unit and a control unit. The collection unit collects job logs, inclusive of information of identification of users having requested jobs, time of execution of each job and information of each aggregation target, from execution devices by which the jobs have been executed. The job log storage unit stores the collected job logs. The section information storage unit stores information of sections to which the users belong respectively. The update unit updates the information of sections stored in the section information storage unit based on change information indicating information of change. The record creation unit extracts a user identifier from each of job logs stored in the job log storage unit in accordance with check points and created newly after the last check point, acquires information of user section from the section information storage unit based on the extracted user identifier and creates a user change history record which includes the user identifier indicated by the job log, a period including the time of execution of the job indicated by the job log, and information of the section indicated by the job log. The change history record storage unit stores the user change history record. The association unit associates the aggregation target information of the job log with the information of user section based on the user change history record with respect to each job log. The control unit controls the update unit so that the change information concerned with section change older than the period including the time of execution of the job indicated by the job log as each base of the user change history record is not reflected in the section information storage unit before the user change history record is created.

BRIEF DESCRIPTION OF THE DRAWINGS

Exemplary embodiments of the invention will be described in detail based on the following figures, wherein:

FIG. 10 is a view showing an example of section change of a user A for explaining the embodiment with a specific example;

FIG. 11 is a view showing an example of section change of a user B for explaining the embodiment with a specific example;

FIG. 12 is a view showing an example of a change history file for explaining the embodiment with a specific example;

FIG. 19 is a flow chart for explaining a change information update operation example according to the modification.

DETAILED DESCRIPTION

An exemplary embodiment of the invention will be described below.

Figure 1:
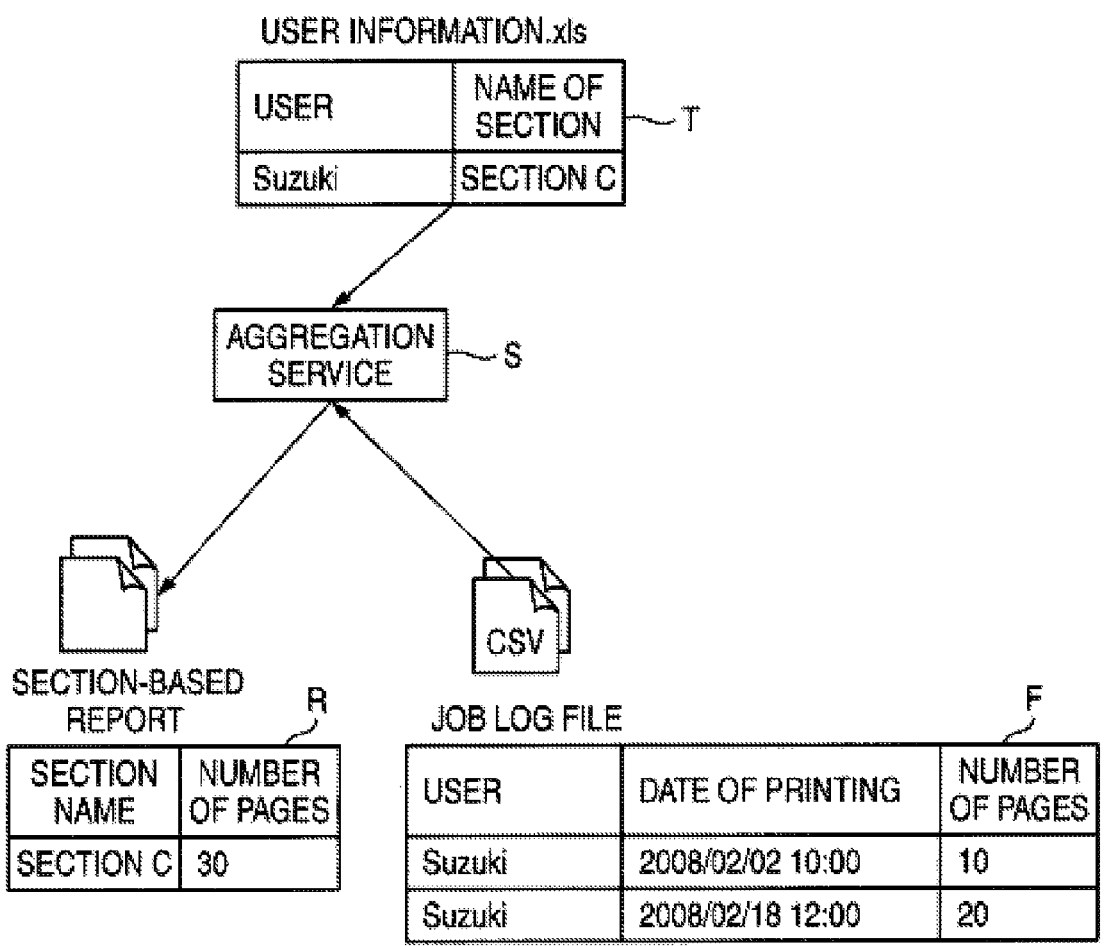
FIG. 1 is a view for explaining an example according to the background art.
Figure 2:
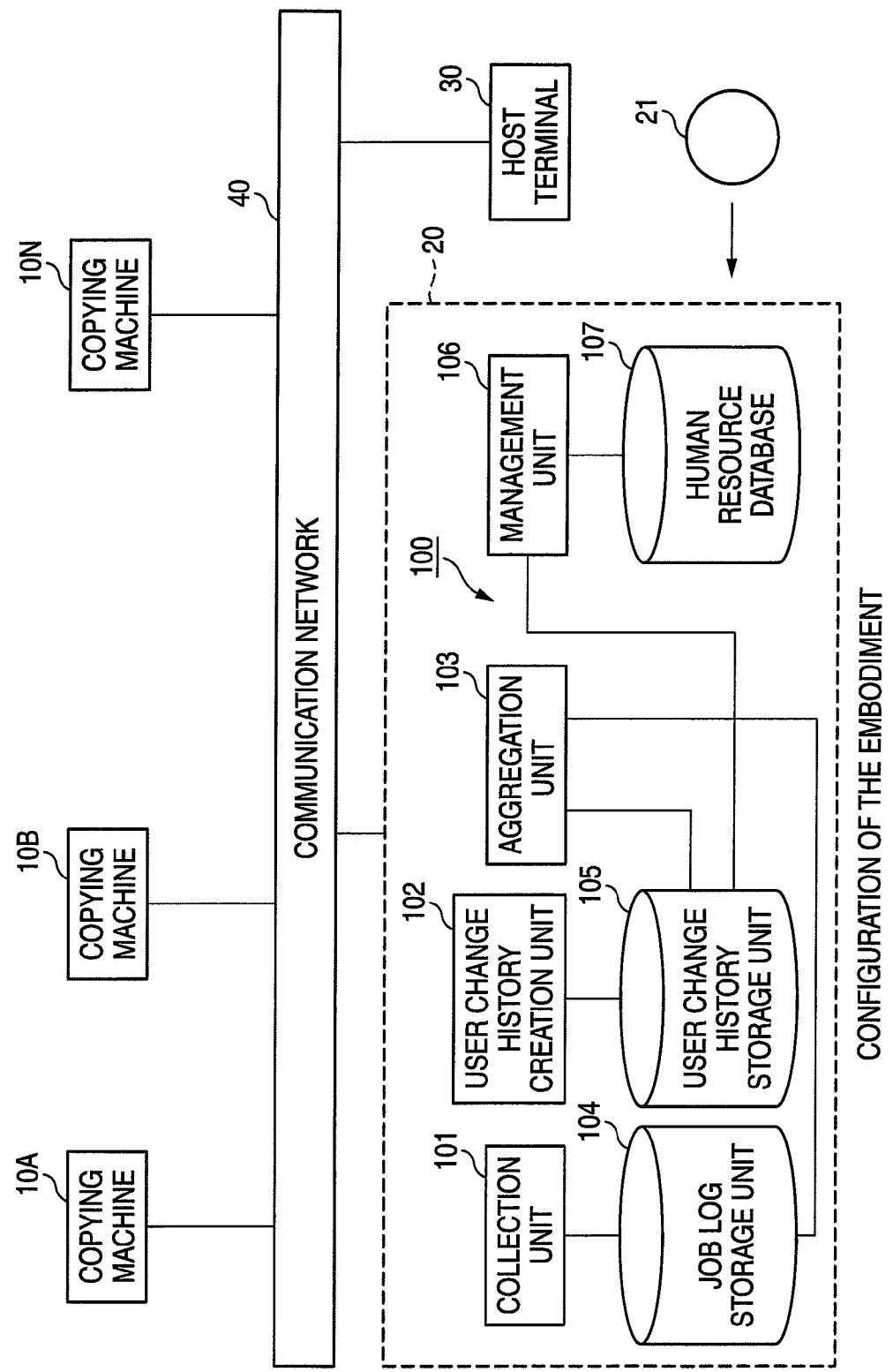
FIG. 2 is a view for explaining a job log aggregation system according to an embodiment of the invention and an environment in use of the job log aggregation system.

FIG. 2 shows an overall computer environment of a job log aggregation system 100 according to an exemplary embodiment of the invention. In the embodiment, the job log aggregation system 100 is implemented by a server computer 20. Alternatively, the job log aggregation system 100 may be implemented by a combination of computers. The job log aggregation system 100 is implemented under installation of a job log aggregation program (which may include program modules for achieving other auxiliary functions) in the server computer 20 through a recording medium 21 (such as a CD-ROM) or a communication line. The server computer 20 includes commonly known components such as a CPU, a main memory, a bus, various kinds of I/O devices, etc. Hardware resources of the server computer 20 cooperate with software resources such as programs of the recording medium 21 to achieve various functional units of the job aggregation system 100 which will be described below specifically.

In FIG. 2, an arbitrary number of copying machines 10A to 10N (which may be simply generically called "10"), the server computer 20, a host terminal 30, etc. are connected to a communication network 40. Although the copying machines 10 are shown in this example, the copying machines 10 may be replaced by facsimile machines, printers or multifunctional machines having functions of these devices. Although a target of job log aggregation is the number of pages for forming images in this example, any resource such as the time of communication, the time of use or the program consumed in accordance with a job request may be aggregated instead. Incidentally, a job means a continuous mass of processing unit which a user requests a data processing system to do. Although this example will be described in the case where a job is typically a copying process executed in accordance with a user instruction, the invention is not limited thereto. A job log means historical data of job execution. Typically, a job log indicates when, which process was requested based on whose request. Although this example will be described later in the case where the job log includes the name of a user, the time of printing, the number of print pages as an aggregation target, etc., the invention is not limited thereto. Here, one job log, i.e. one processing unit recorded in a continuous mass of historical data of processing is treated as a job.

Each copying machine 10 executes a job requested by a user and stores/holds a job log of the job in a storage unit inside the copying machine 10. Although the job log contains the information of identification of the user, the time of execution of the job, the amount of the job (the number of pages), etc., the job log varies according to the contents of the job. The copying machine 10 executes a job log management service. The job log management service exchanges information with a job log collection unit 101 of the job log aggregation system 100 through the communication network 40 to thereby feed the job log to the job log collection unit 101. The job log aggregation system 100 will be described later.

The job log aggregation system 100 includes the job log collection unit 101, a user change history creation unit 102, a job log aggregation unit 103, a job log storage unit 104, a user change history storage unit 105, a database management unit 106, a human resource database 107, etc. The job log collection unit 101 cooperates with job log managing programs of the copying machines 10 to collect job logs held in the copying machines 10 and store the collected job logs in the job log storage unit 104. Typically, collection of job logs is performed periodically. The user change history creation unit 102 refers to the human resource database 107 to thereby determine whether a section which each user belongs to has been changed or not in a range of newly collected job logs. The user change history creation unit 102 creates a user change history (see FIG. 4) for the user who has encountered the change, and stores the user change history in the user change history storage unit 105. The user change history includes the information of identification of the user, the date of addition (the date of execution of each job) and the information of the section (the name of the section and the information of identification of the section) after the change. A detailed example of the user change history creation unit 102 will be described below with reference to FIG. 5. The job log aggregation unit 103 classifies job logs of the job log storage unit 104 into user sections by referring to user change histories of the user change history storage unit 105, and aggregates the job logs in accordance with each section. An example of the job log aggregation operation will be described with reference to FIG. 6. Incidentally, an aggregation operation in accordance with each upper section will be described later directly or indirectly with reference to FIGS. 13 to 16.

The management unit 106 operates to control updating of the human resource database 107. Although the human resource database 107 holds human resource management information, the human resource database 107 in relation with this embodiment holds information of sections to which users belong respectively, and information of upper sections to which such lower sections belong respectively. The host terminal 30 connected to the server computer 20 (job log aggregation system 100) through the communication network 40 can instruct the management unit 106 to update the contents of the human resource database 107 based on information of change. The management unit 106 controls the update operation so that the information of change is not reflected in the human resource database 107 unless the user change history creation unit 102 has processed completely all job logs each having the date of execution older than the date of change of the change information to be updated. For example, when job logs under the date of March 31 have not been processed yet by the user change history creation unit 102 though the date of change in the information of change is April 1, the information of change is prevented from being reflected in the human resource database 107 to thereby avoid creation of a user change history indicating that the change was carried out on the date of March 31 in association with the job log.

In the exemplary embodiment, an identifier (e.g. user name) which can identify a user, the time of printing, information about the number of pages, etc. necessary for aggregation are recorded on each job log. When there are the date of printing start (start time) and the date of printing end (end time), one of the two is regarded as the time or date of printing. Typically, the date of printing end (end time) is regarded as the date (time) of printing.

It is assumed that the contents of the human resource database 107 are a result of reflection of human resource information existing at any time when the date is changed. However, the invention is not limited thereto. For example, the contents of the human resource database 107 may be changed before the date is changed.

The user change history creation unit 102 creates a user change history file by referring to the human resource database 107, and creates section-based reports based on the user change history file. The user change history contains identifiers (e.g. user names) which can identify users, dates of addition (each of which is the date before the date of creation (update) of the user change history file in this embodiment because the user change history file is created (updated) based on the job log of each job the date of execution of which is before the date of creation of the user change history file), and changed section names (change destination section names). Typically, the user change history is created daily whenever the date is changed (the user change history file is updated daily). However, another timing (also referred to as check point) for starting creation of the user change history can be used variously. When, for example, jobs are created only on company's working days or system's operating days, the time of change under the date next to each working day or each operating day can be used as a check point for starting creation of the user change history file. In addition, a time unit shorter or longer than one day may be set as the interval between check points. Description will be made below in the case where the time that the date is changed is used as a check point.

The process of updating the human resource database 107 is performed after the process of creating the change history file, so that the information of change is prevented from being reflected in the human resource database 107 unless the user change history creation unit 102 has processed completely all job logs the date of execution of which is before the date of change of the change information to be updated.

An example of operation according to the embodiment will be described below with reference to FIGS. 3 and 4.

In this example, section-based aggregation reports corresponding to users' section changes in a duration of aggregation are created by use of the job log files containing identifiers (e.g. user names) which can identify users and information of "dates of printing" and the user change history file (including at least one user change historical data) containing user change information. The change history file is created based on the human resource database 107.

Figure 3:
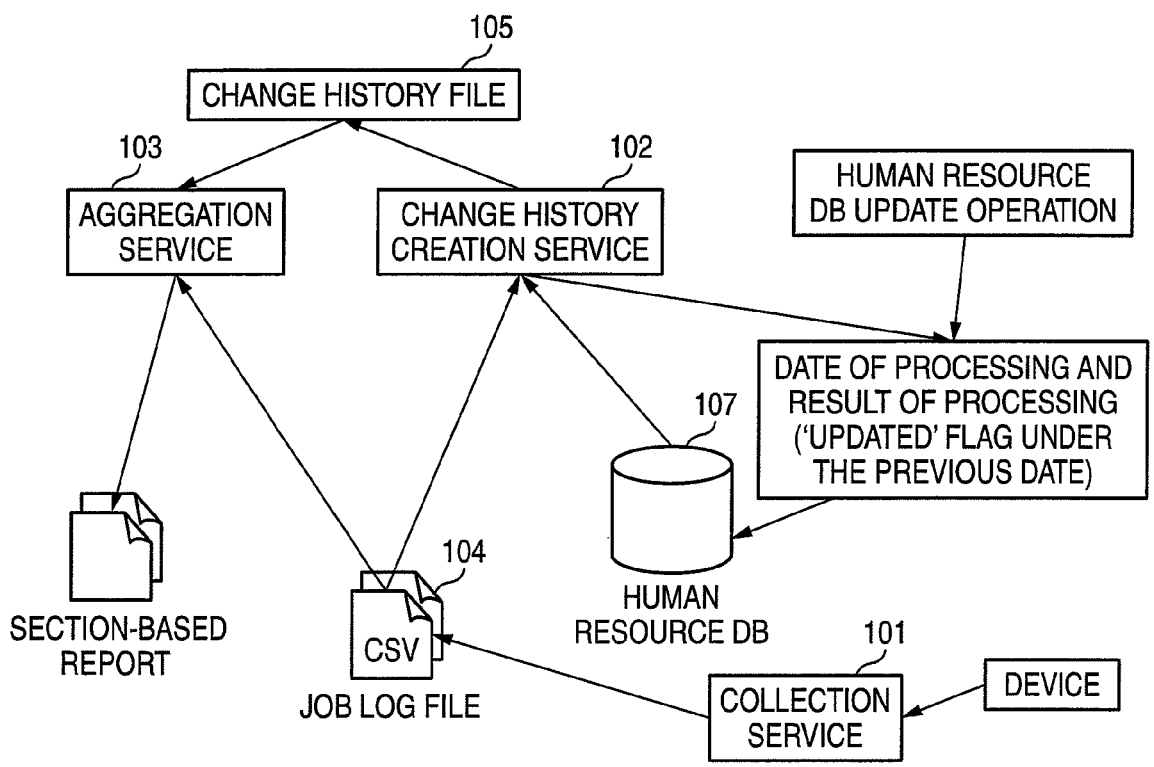
FIG. 3 is a view for explaining an overall operation example according to the embodiment.

As shown in FIG. 3, the job log collection service (the job log collection unit 101) collects job logs and holds the job logs as job log files (in the job log storage unit 104). The user change history creation service (the user change history creation unit 102) refers to job logs under the date before the date of creation (that day) to thereby create a user change history of all users whose sections are different from sections referred to at the last time, and holds the user change history as a user change history file (in the user change history storage unit 105). The user change history includes information for identifying users, dates of addition (each of which is before the date of creation of the user change history file), and information for identifying new sections. The aggregation service (the aggregation unit 103) aggregates the job logs in accordance with each section based on the information of change indicated by the user change history file 105.

Figure 4:
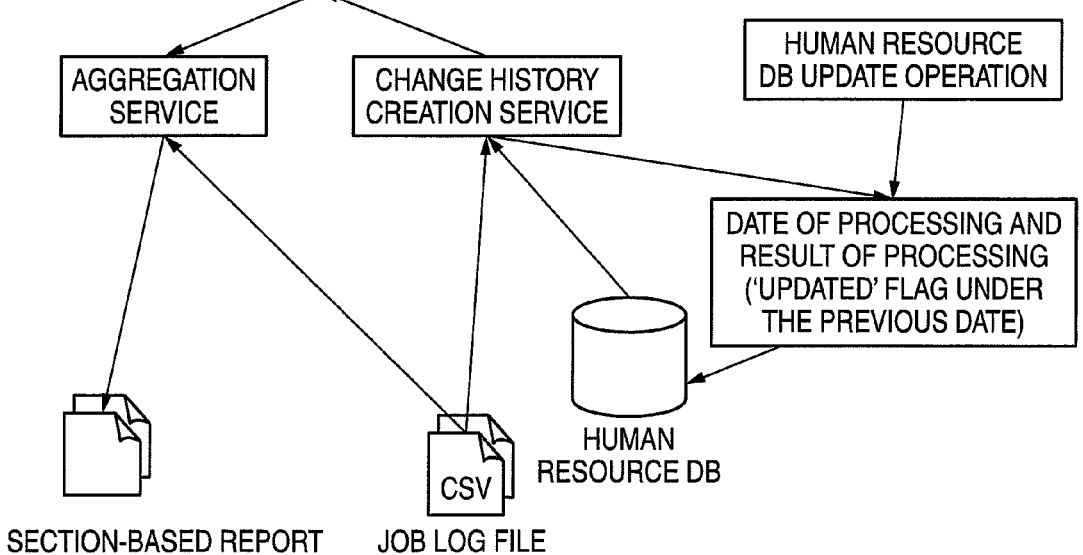
FIG. 4 is a view for explaining the operation example by use of job logs as examples.

FIG. 4 shows an example of aggregation of job logs. In this example, a user "Suzuki" printed 10 pages and 20 pages on the date of 2008/02/02 (meaning Feb. 2, 2008) and on the date of 2008/02/18 (meaning Feb. 18, 2008), respectively. This rule for expressing the date will apply hereinafter. Because the user "Suzuki" belonged to section B on the date of 2008/02/02, change historical data "Suzuki: 2008/02/02: section B" is created. Because the user "Suzuki" belonged to section C on the date of 2008/02/18, change historical data "Suzuki: 2008/02/18: section C" is created. Section-based reports "section B: 10 pages" and "section C: 20 pages" are created based on the change historical data and the job logs. This example has been described in a simplified manner. For example, assume that the user "Suzuki" still belonged to section B on the date of 2008/02/15 and printed 30 pages, then user change historical data is not created because there was no section change. The 30 pages on the date of 2008/02/15 are aggregated on the "section B" by referring to the latest user change historical data "Suzuki: 2008/02/02: section B" at that time point.

Next, user change history creation processing will be described with reference to FIG. 5.

Figure 5:
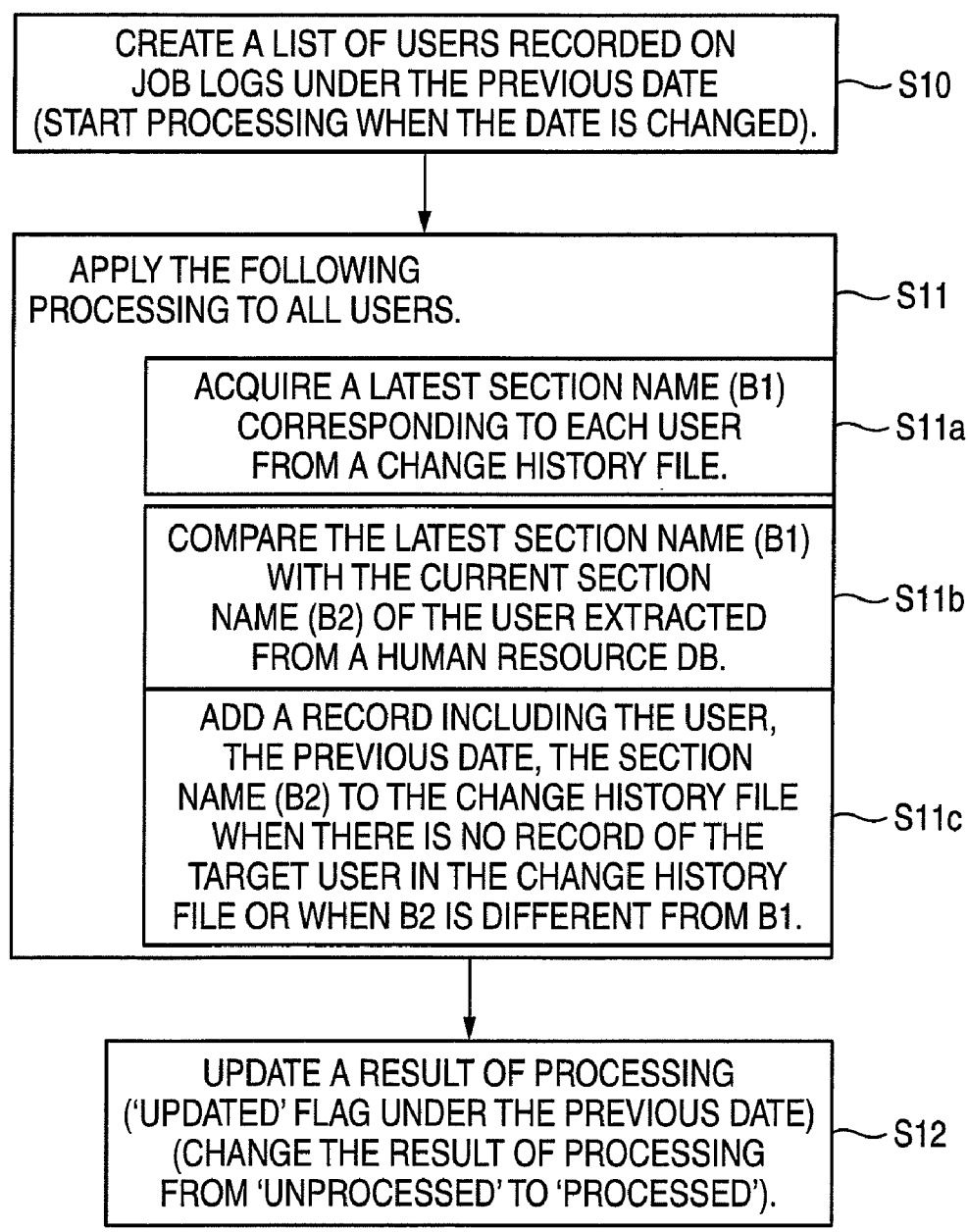
FIG. 5 is a flow chart for explaining an operation example of user change history creation processing according to the embodiment.

As shown in FIG. 5, the user change history is created as follows.

[Step S10]: Create a list (user list) of users who requested jobs on the previous date, from information recorded on job logs under the previous date.

[Step S11]: Apply the following processing to all users contained in the user list.

(S11a) Acquire the name (B1) of a latest section corresponding to each user from a user change history file.

(S11b) Acquire the name (B2) of a current section corresponding to the user from the human resource database 107 and compare the current section name (B2) with the latest section name (B1).

(S11c) Add a record including the information of identification of the user, the previous date (the date of addition) and the information of identification of the section name (B2) to the user change history file when there is no target user record in the user change history file or when B2 is different from B1.

[Step S12]: Update the result of processing (flag indicating whether the update process on the previous date [the process of adding necessary information to the user change history file] has been completed or not) (change the result of processing from 'unprocessed' to 'processed').

Incidentally, the result of processing is held in any storage unit (e.g. the user change history storage unit 105 or the like). The result of processing is referred to by the management unit 106 when the human resource database 107 is updated.

The user change history file is used for section-based aggregation of job logs which will be described below.

Figure 6:
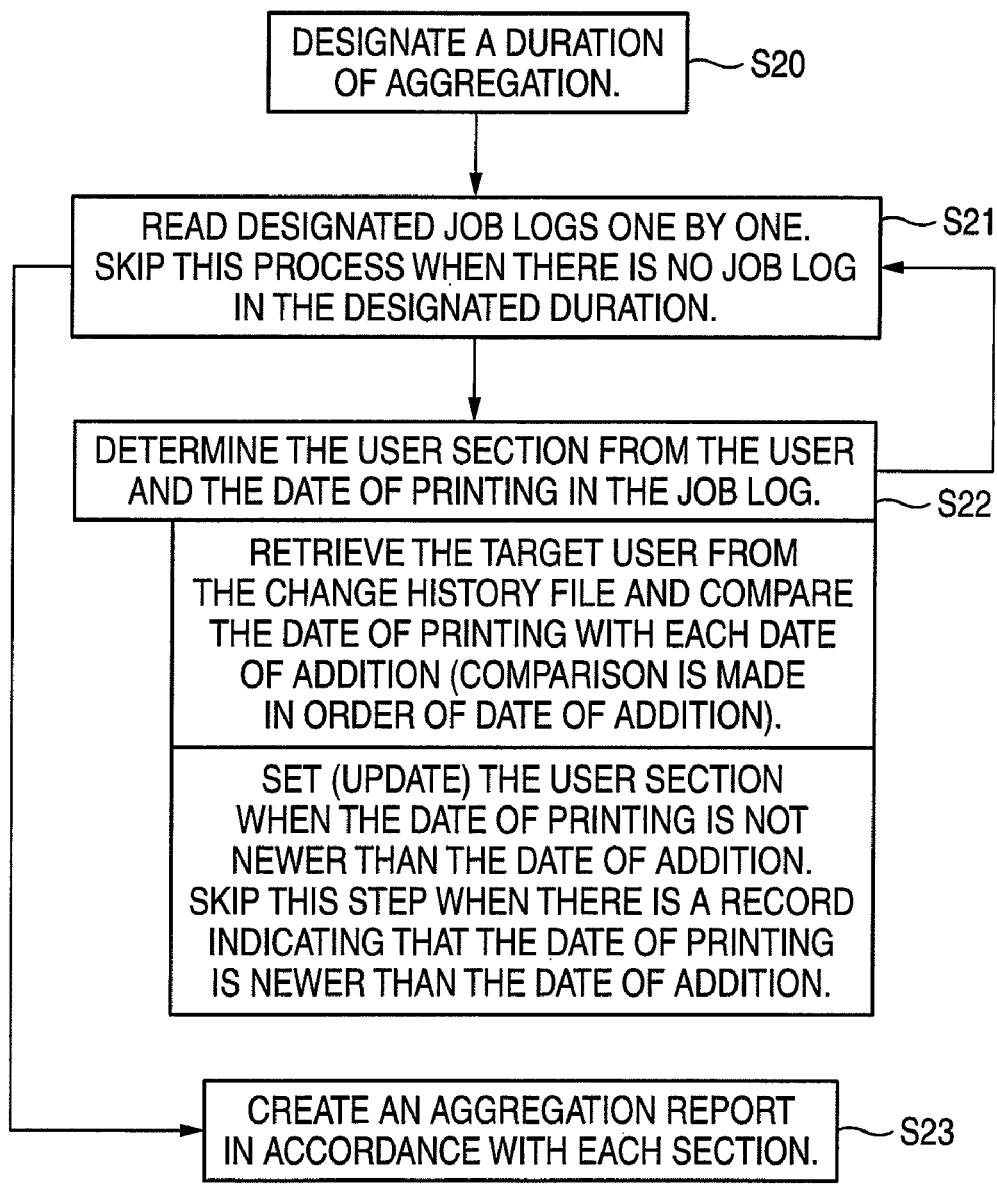
FIG. 6 is a flow chart for explaining an operation example of section-based report creation processing according to the embodiment.

As shown in FIG. 6, section-based aggregation of job logs is performed as follows. [Step S20]: First, designate a duration of aggregation. The duration can be designated in any host terminal or the server computer 20.

[Step S21]: Read one-job's information from job logs in the designated duration. Repeat this step while any job log remains in the duration. Skip this step to step S23 if no job log exists or remains in the designated duration. Otherwise, go to step S22.

[Step S22]: Determine the user section based on the information of the user and the date of printing in the job log and the information of the user change history file. Specifically, retrieve records of the target user from the user change history file and compare the date of printing in the job log with each date of addition in the user change history file. Here, comparison is performed in order of date of addition in the retrieved records. Set (update) the section to which the user belonged (on the date of printing), successively based on the information of change (in a record corresponding to the date of addition in the user change history file) as long as the date of printing is not older than the date of addition. Return to the step S21 to read next one-job's information from the job logs when comparison with the date of printing is completed on all the retrieved records or when there is found any record having the date of addition newer than the data of printing.

[Step S23]: Create section-based reports by aggregating the job logs in accordance with the determined sections.

Next, an operation of updating the human resource database 107 will be described.

Figure 7:
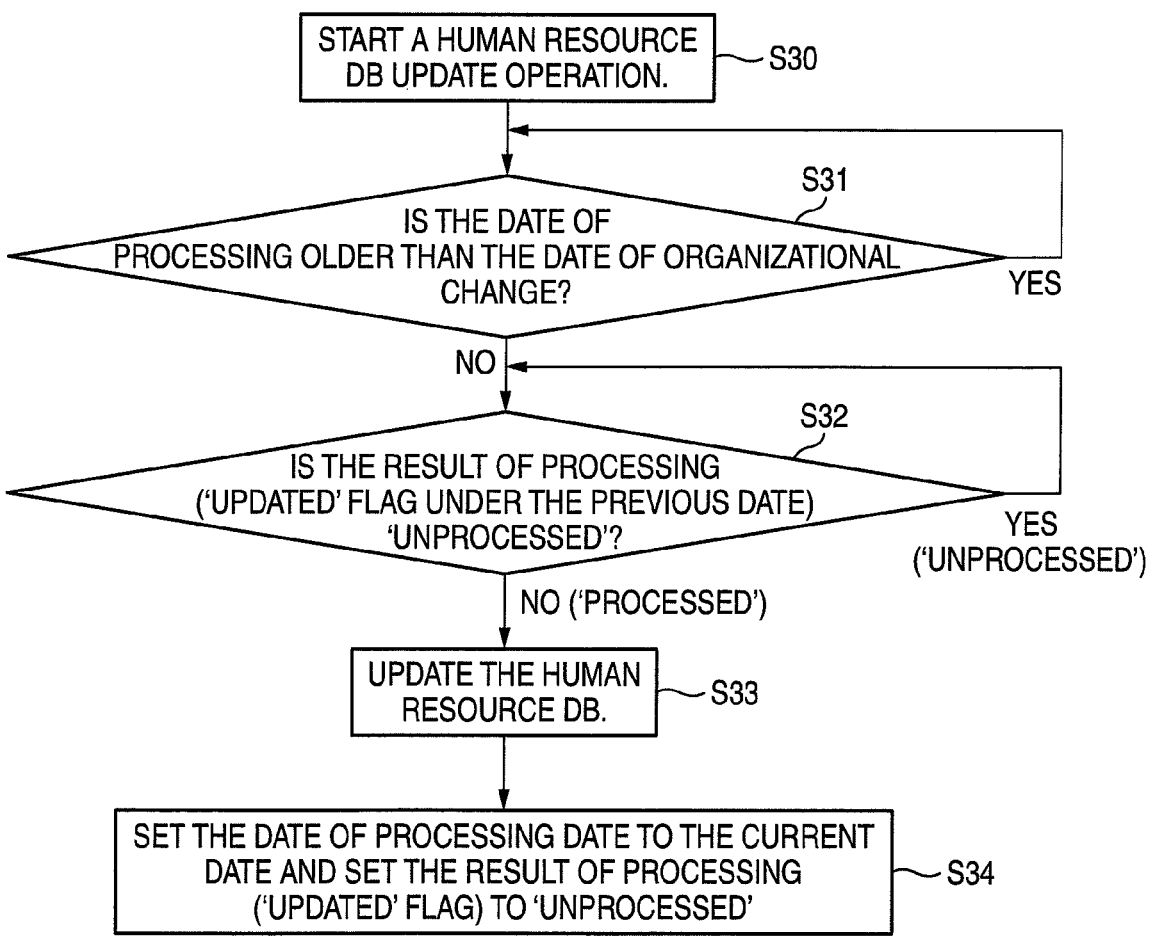
FIG. 7 is a flow chart for explaining an operation example of human resource database update processing according to the embodiment.

As shown in FIG. 7, this update operation will be performed as follows. Incidentally, the following steps S30 to S34 are executed by the management unit 106.

[Step S30]: Start an operation of updating the human resource database 107. Typically, the operation is started in accordance with an instruction given from the host terminal 30.

[Step S31]: Determine whether the date of processing in each change information is older than the date of organizational change or not. Repeat this step to process the next change information when the date of processing is older than the date of organizational change.

[Step S32]: Determine whether the result of processing ('updated' flag under the previous date) is 'unprocessed' or not. Repeat this step without any processing while the result of processing is 'unprocessed'.

[Step S33]: Update the human resource database 107 based on the change information.

[Step S34]: Set the date of processing data to the current date and set the result of processing ('updated' flag) to 'unprocessed'.

Next, an operation according to the embodiment will be further described while a specific example of change is taken.

Figure 8:
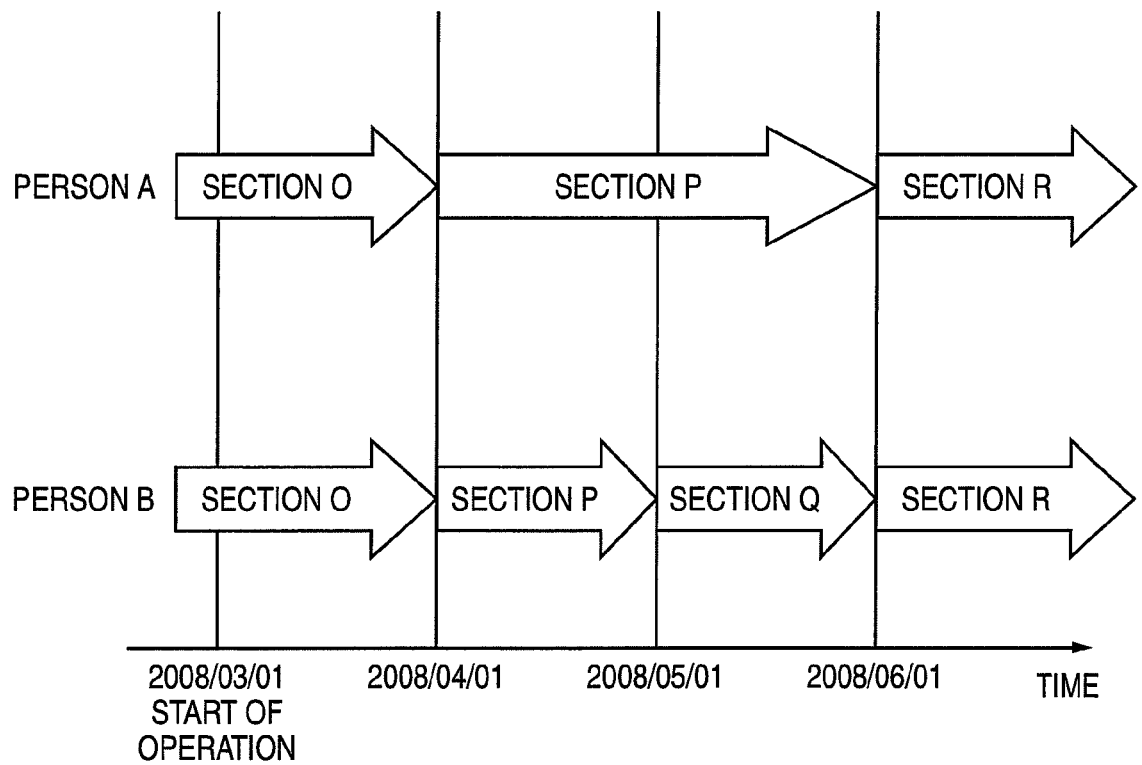
FIG. 8 is a view showing examples of section changes for explaining the embodiment with specific examples.
Figure 9:
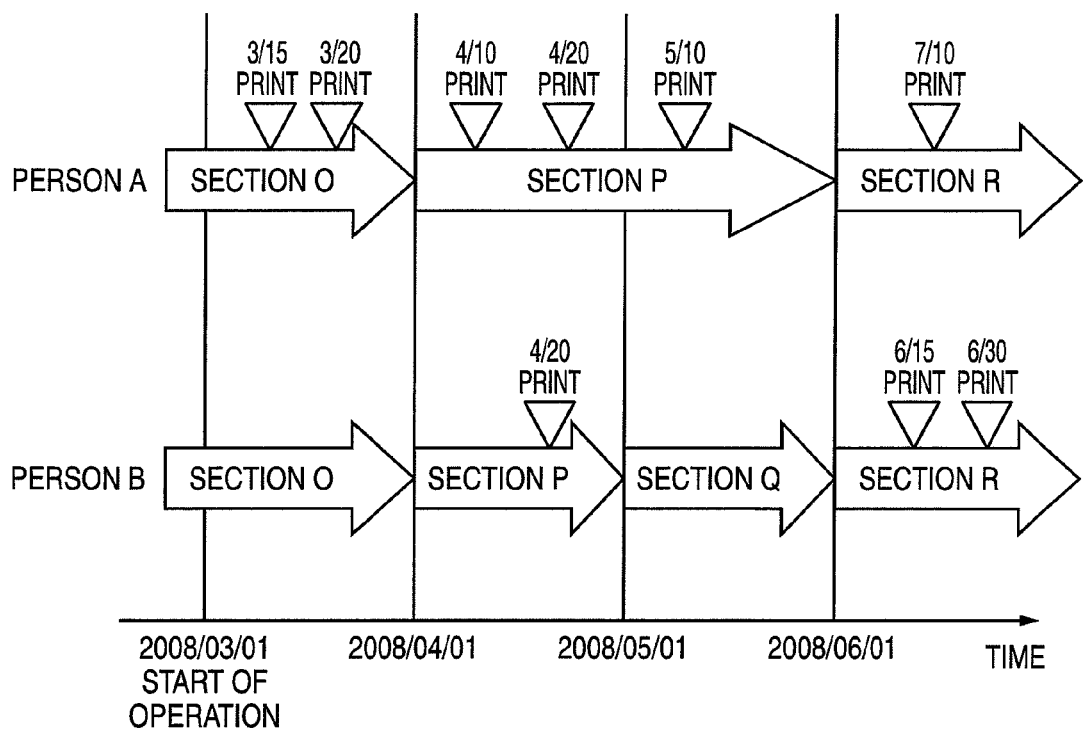
FIG. 9 is a view showing examples of section changes and print historical data for explaining the embodiment with specific examples.

FIG. 8 shows change historical data of two users A and B. FIG. 9 shows job historical data of the users A and B having such change historical data. The change historical data of FIG. 8 can be tabulated as shown in FIGS. 10 and 11.

In this example, a user change history file is as shown in FIG. 12. As for the user A, user change historical data having the first printing date of March 15 (March 15) as the date of addition and section O as the user section is created after the system operation is started. Because the user A still belonged to section O on the printing date of March 20, user change historical data on the printing date of March 20 is not added. Because the user section had been changed from section O to section P on the printing date of April 10, user change historical data having April 10 as the date of addition and section P as the user section are created. Because the user A still belonged to section P on the printing dates of April 20 and May 10, user change historical data on April 20 and May 10 are not added. Because the user section had been changed from section P to section R on the printing date of July 10, user change historical data having July 10 as the date of addition and section R as the user section are created. In this manner, user change historical data for the user A are created as represented by the first, second and fifth lines in FIG. 12. Similarly, user change historical data for the user B are created as shown in FIG. 12. The change history file is created for the purpose of aggregating jobs in accordance with sections under each date of printing, but not for the purpose of creating personnel change information completely. The user change historical data are not required for all job logs as long as the user change historical data are created in a range of reflection of change. Incidentally, in the aforementioned example, user change historical data even on the printing dates of March 20, April 20 and May 10 (i.e. even when the user section was not changed since last time) may be added.

Although the example has been described on the assumption that the current human resource information is reflected in the human resource database 107 at any timing when the date is changed, the invention is not limited thereto. For example, a database update instruction for the human resource database 107 may be given before real organizational change (e.g. organizational change effective on the date of April 1 may have been performed on the date of March 31). However, a final update process for the human resource database 107 must be waited for unless relevant change historical data are created. Therefore, for example, the date of creation of the change history file is given to data as a result of processing. When the update process for the human resource database 107 will be performed on the date of March 31, the update process for the human resource database 107 must be waited for because the result of processing is 'processed' only up to March 30. When the change history creation service operates after 0:00 on the date of April 1, the result of processing is changed to 'processed' under the date of March 31 and then organizational information on the date of April 1 is reflected. After that, the result of processing is set to 'unprocessed' on the date of April 1.

Next, creation of upper section-based aggregation reports will be described. In a tree-structure hierarchy of an organization such as a company or a school, assume that one entity (node) is followed by another entity in a leaf direction of the tree structure. Then, one entity is called 'upper entity' and the other entity is called 'lower entity'. Only one link (edge) may be interposed in an upper or lower entity (direct upper or lower entity) or a plurality of links may be interposed in an upper or lower entity (indirect upper or lower entity). In view from a lower entity, an upper entity is called 'dominant section'. An upper entity with interposition of one link is called 'direct upper section'. An upper entity with interposition of a plurality of links is called 'indirect upper section'.

Even when the organizational hierarchy has a lot of layers, section reports of upper layers are created recursively by use of an organizational change history file with aggregation results of lower sections as base data, and monthly section reports in a certain hierarchical section are created finally.

Figure 13:
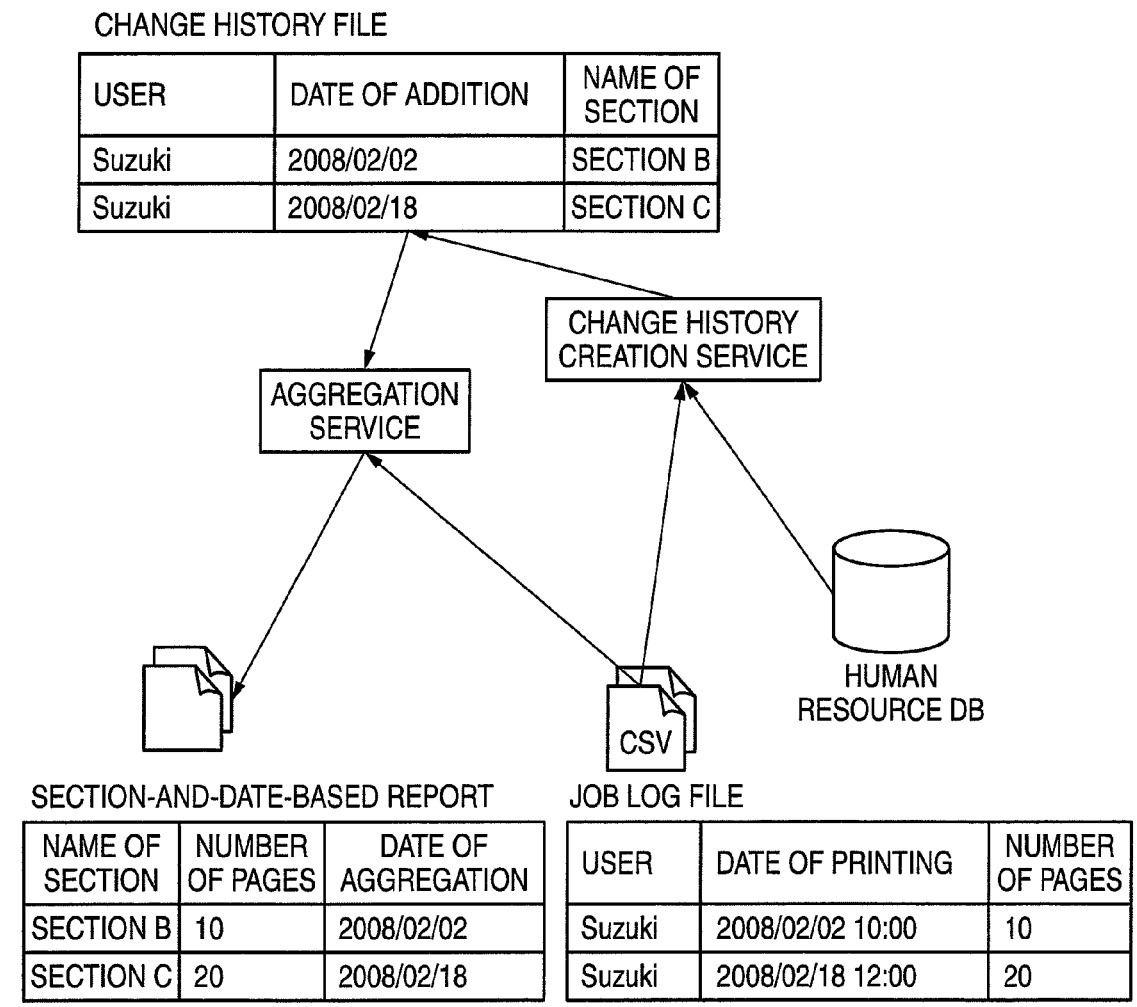
FIG. 13 is a view for explaining an example of creation of lower section-and-date-based reports for explaining an upper section-based aggregation operation.
Figure 14:
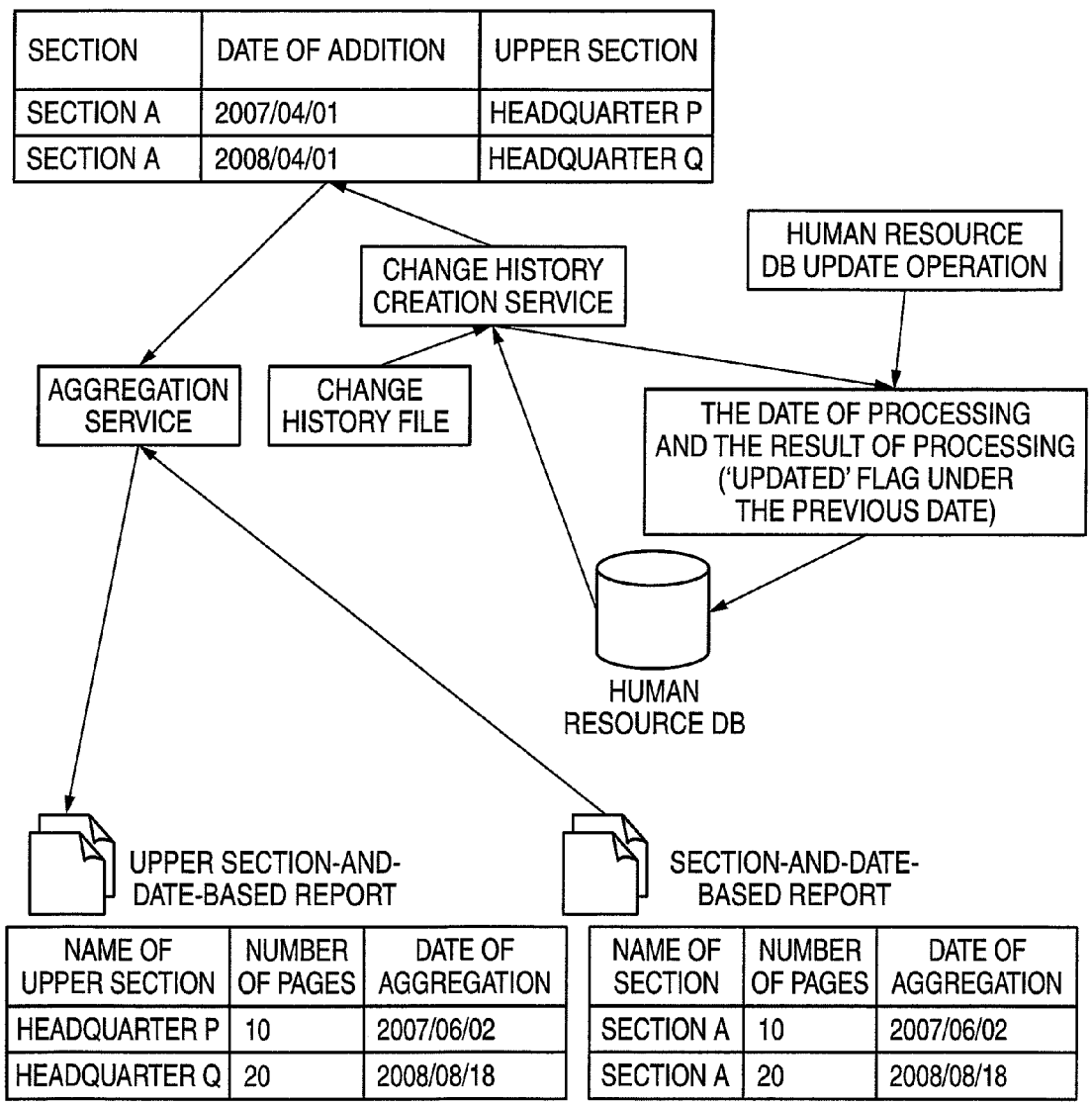
FIG. 14 is a view for explaining an operation example of creation of upper section-and-date-based reports from the lower section-and-date-based reports.

That is, as shown in FIG. 13, section-based aggregation reports are created from job logs of users in accordance with sections to which the users directly belong. As shown in FIG. 14, upper section aggregation reports are created recursively by use of the section-based aggregation reports as base data. In this case, for example, the human resource database provides change information (dates of change and information of identification of upper sections) of upper sections to which sections belong.

Figure 15:
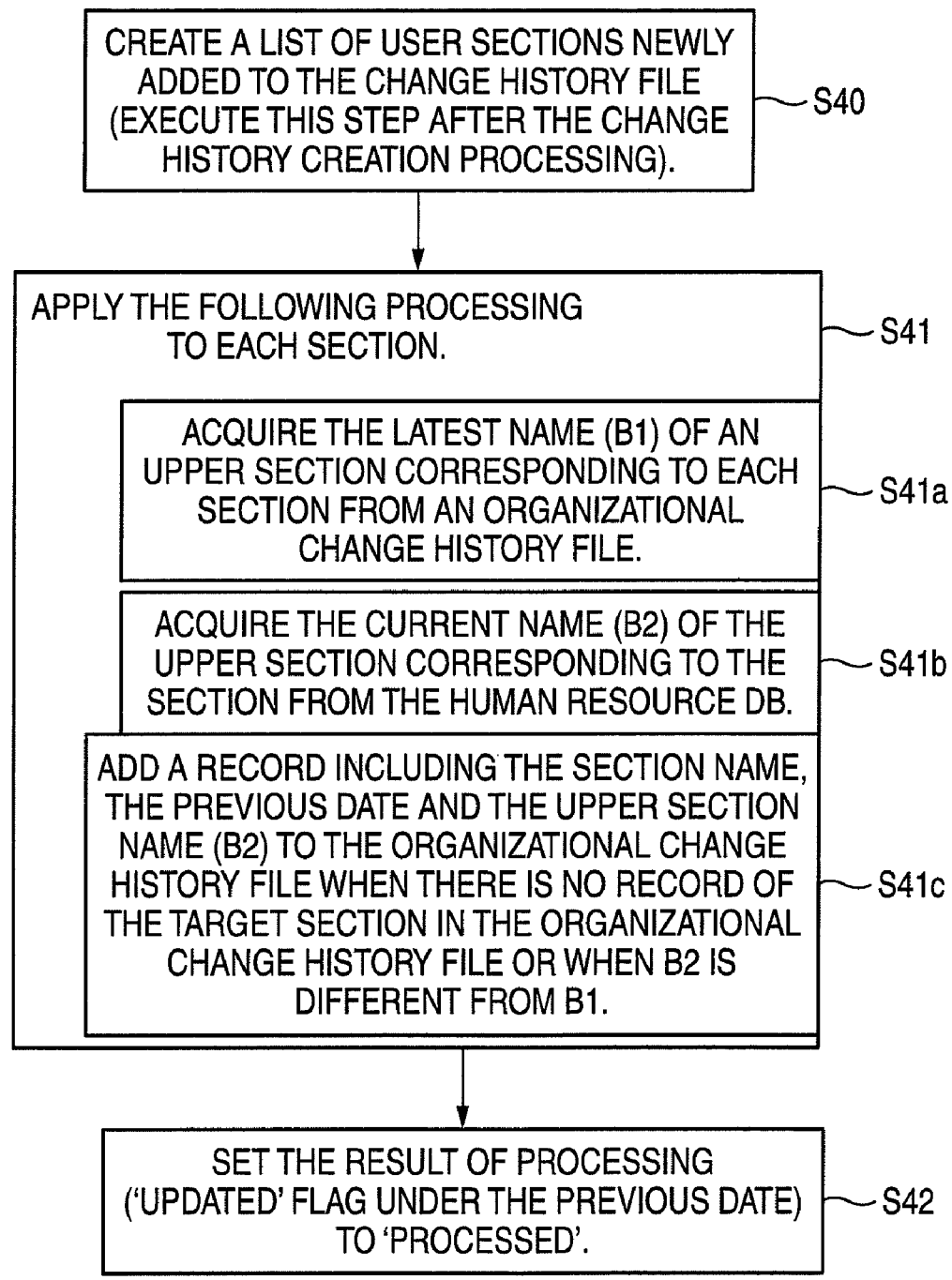
FIG. 15 is a flow chart for explaining an operation example of creation of an organizational change history for creating the upper section-and-date-based reports.

FIG. 15 shows a process of creating organizational change historical data (corresponding to the aforementioned user change historical data). Details thereof are as follows.

[Step S40]: Create a list of user sections newly added to the change history file (typically, execute this step after the user change history creation processing).

[Step S41]: Apply the following processing to each of sections included in the list.

(S41a) Acquire the name (B1) of a latest upper section corresponding to each lower section from the organizational change history file.

(S41b) Acquire the name (B2) of a current upper section corresponding to the lower section from the human resource database 107 and compare B2 with B1.

(S41c) Add a record containing identification information of the lower section, the previous date (the date of addition), and identification information (B2) of the upper section to the organizational change history file when there is no record of the target section in the organizational change history file or when B2 is different from the B1.

[Step S42]: Update the result of processing ('updated' flag under the previous date) (change the result of processing from 'unprocessed' to 'processed').

Figure 16:
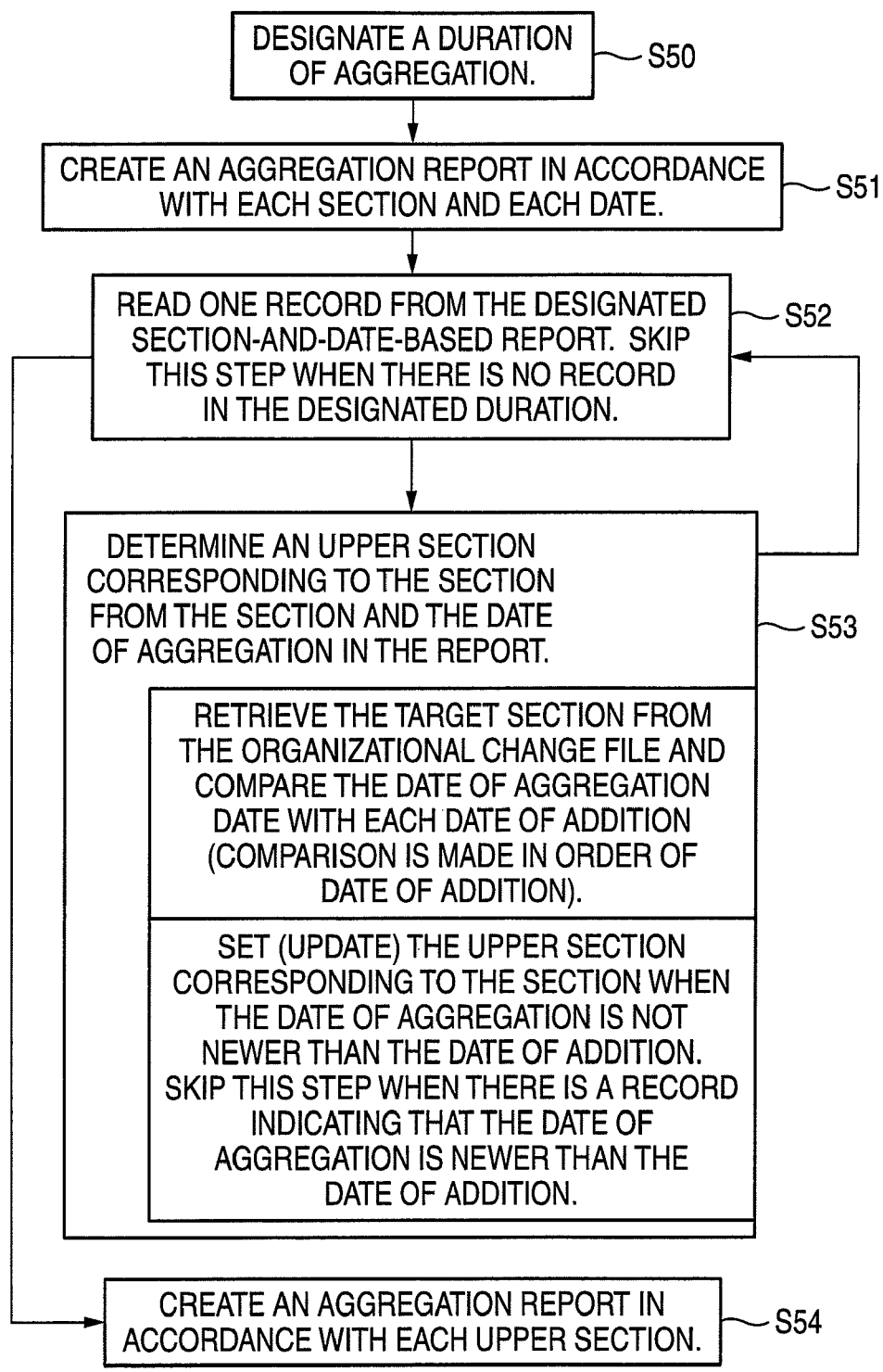
FIG. 16 is a flow chart for explaining an operation example of creation of the upper section-and-date-based reports.

FIG. 16 shows a process of aggregating job logs in accordance with upper sections. Details thereof are as follows.

[Step S50]: First, designate a duration of aggregation. The duration can be designated in any host terminal or the server computer 20.

[Step S51]: Create aggregation reports in accordance with sections and dates.

[Step S52]: Read one record from each section-and-date-based aggregation report in the designated duration. Repeat this step while any record remains. Skip this step to step S54 if no record exists or remains in the designated duration. Otherwise, go to step S53.

[Step S53]: Determine the upper section from the section and the date of aggregation in the report. Specifically, retrieve a target section from the organizational change history file and compare the date of aggregation in the aggregation report with each date of addition in the organizational change history file. Incidentally, the comparison is performed in order of date of addition. Set (update) the upper section corresponding to the section when the date of aggregation is not older than the date of addition. Return to the step S52 to repeat the processing when there is found any record having the date of printing newer than the date of addition.

[Step S54]: Create upper section-based aggregation reports by aggregating lower section-based aggregation reports in accordance with the determined upper sections.

Incidentally, in the case where direct connection to the human resource database is not allowed, the human resource database 107 shown in FIG. 2 is replaced by a backup human resource database. The update time from the main human resource database to the backup human resource database is set to be after the result of processing ('updated' flag) under the date before the date of organizational change has succeeded (has been changed to 'processed').

Figure 17:
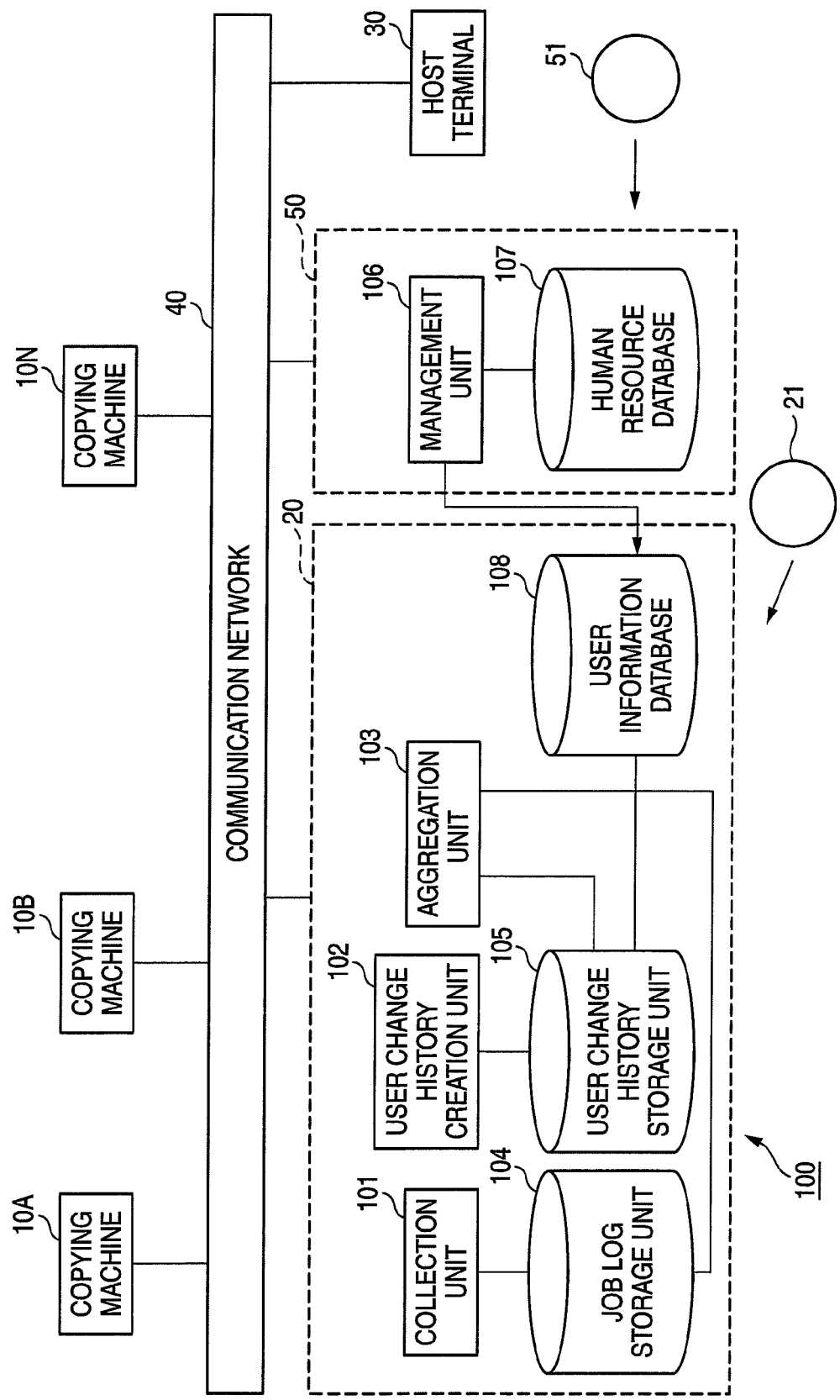
FIG. 17 is a view for explaining a modification of the embodiment.

FIG. 17 shows a modification using such a backup database (also referred to as 'user information database') of the human resource database.

In FIG. 17, like parts corresponding to those in FIG. 2 are referred to by like numerals. In the modification shown in FIG. 17, a server computer 50 is added so as to be equipped with the human resource database 107. The job log aggregation system 100 of the server computer 20 and the human resource database of the server computer 50 are implemented with installation of programs through recording media 21 and 51 or the communication network.

Figure 18:
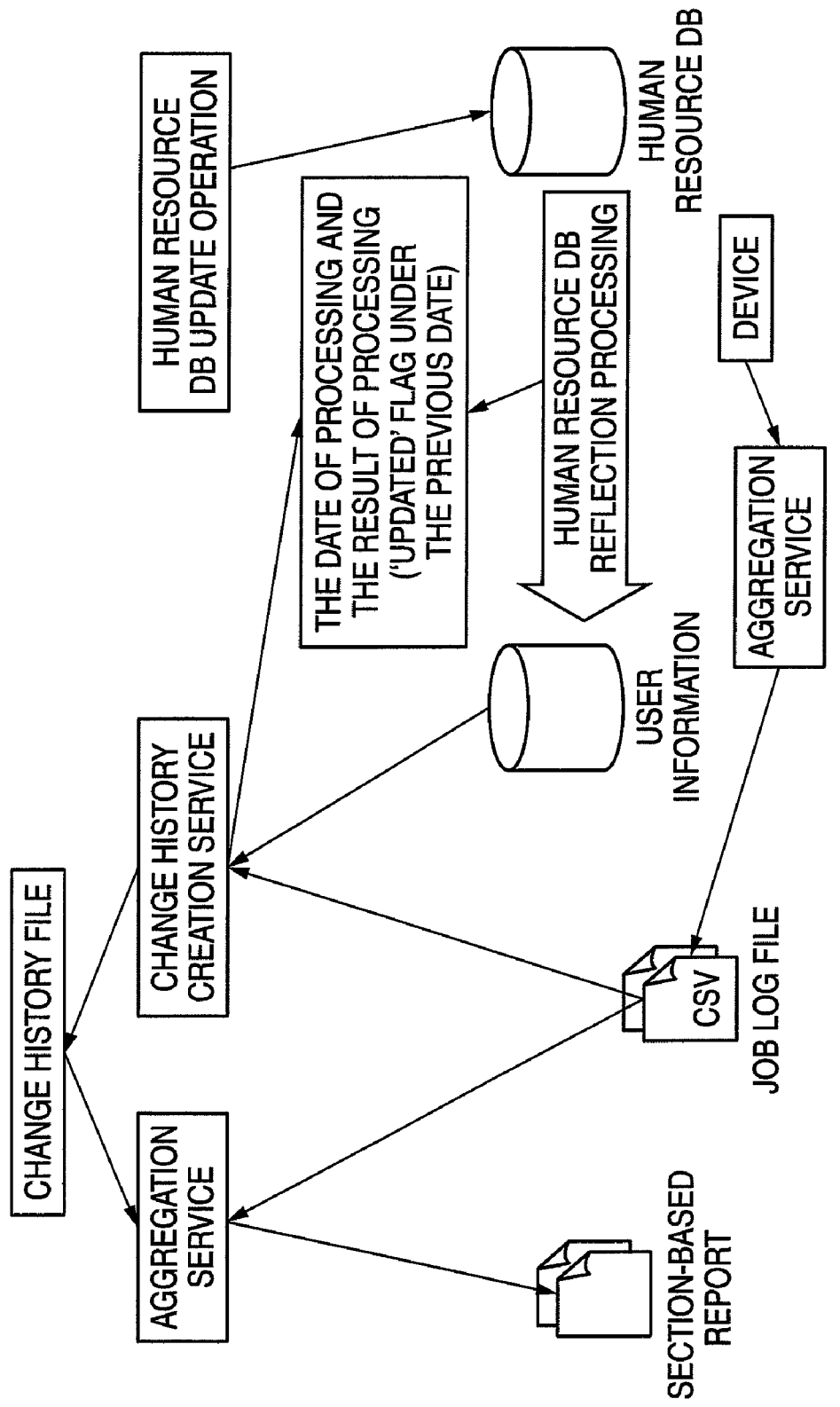
FIG. 18 is a view for explaining an overall operation example of the modification.

The modification in FIG. 17 operates as shown in FIG. 18. In this modification, the time of reflection of update from the human resource database 107 to a backup user information database 108 is set to be after the result of processing ('updated' flag) under the date before the date of organizational change has succeeded (has been changed to 'processed').

FIG. 19 shows an example of an operation of updating the backup user information database 108. The operation is as follows.

[Step S60]: Start an operation of updating the human resource database 107. Typically, this operation is started based on an instruction given from the host terminal 30.

[Step S61]: Start a process of reflection in the backup user information database 108.

[Step S62]: Determine whether the date of processing in each change information is older than the date of organizational change or not. Repeat this step to process the next change information when the date of processing is older than the date of organizational change.

[Step S63]: Determine whether the result of processing ('updated' flag under the previous date) is 'unprocessed' or not. Repeat this step without any processing when the result of processing is 'unprocessed'.

[Step S64]: Update the backup user information database 108 based on the change information.

[Step S65]: Set the date of processing to the current date and set the result of processing ('updated' flag) to 'unprocessed'.

Description about the embodiment and its modifications has been completed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A job log processing apparatus comprising:
    a processor;
    a memory; and
    a collection unit that, executed on the processor, collects job logs, inclusive of information of identification of users having requested jobs, time of execution of each job, and a number of pages printed, from execution devices by which the jobs have been executed;
    a job log storage unit that, executed on the memory, stores the collected job logs;
    a section information storage unit that, executed on the memory, stores information of a group of users to which the users belong respectively;
    an update unit that, executed on the processor, updates the information of the group of users stored in the section information storage unit based on change information indicating a change of the group of users to which the user belongs to create user change historical data, the user change historical data indicating a date of the change of the group of users and the change of the group of the users;
    a record creation unit that, executed on the processor, extracts a user identifier from each of the job logs stored in the job log storage unit, acquires the information of the group of users from the user change historical data based on the extracted user identifier;
    a change historical data creation unit that, executed on the memory, creates a user change historical data which includes (i) the user identifier, (ii) the time of execution of the job, and (iii) the information of the group of users indicated by the job log as the group to which the users belong at the time of execution of the job,
    wherein (i) the user identifier and (ii) the time of execution of the lob are extracted from the job log, and
    wherein (iii) the information of the group of users indicating the group to which the users belong at the time of execution of the job is acquired based on the information of the group of users and the job log,
    an association unit that, executed on the processor, associates the number of pages printed of the job log with the group of users based on the group of users acquired from the user change historical data with respect to each job log; and a control unit that, executed on the processor, aggregates the number of pages printed for each group of users based on the user change historical data and each job log, wherein, before a user changes a group of users from a previous group to a new group, the control unit aggregates the number of the pages printed as a usage of the user belonging to the previous group, and wherein, after the user changes the group of users from the previous group to the new group, the control unit aggregates the number of the pages printed as a usage of the user belonging to the new group.

2. A job log processing apparatus comprising:

a processor;

a memory; and a collection unit that, executed on the processor, collects job logs, inclusive of information of identification of users having requested jobs, time of execution of each job, and a number of pages printed, from execution devices by which the jobs have been executed;

a job log storage unit that, executed on the memory, stores the collected job logs;

a section information storage unit that, executed on the memory, stores information of a group of users to which the users belong respectively;

an update unit that, executed on the processor, updates the information of the group of users stored in the section information storage unit based on change information indicating a change of the group of users to which the user belongs to create user change historical data, the user change historical data indicating a date of the change of the group of users and the change of the group of the users;

a record creation unit that, executed on the processor, extracts a user identifier from each of the job logs stored in the job log storage unit, acquires the information of the group of users from the user change historical data based on the extracted user identifier;

a change historical data creation unit that, executed on the memory, creates a user change historical data which includes (i) the user identifier, (ii) the time of execution of the job, and (iii) the information of the group of users indicated by the job log as the group to which the users belong at the time of execution of the job, wherein (i) the user identifier and (ii) the time of execution of the job are extracted from the job log, and wherein (iii) the information of the group of users indicating the group to which the users belong at the time of execution of the job is acquired based on the information of the group of users and the job log, an association unit that, executed on the processor, associates the number of pages printed of the job log with the group of users based on the group of users acquired from the user change historical data with respect to each job log; and a control unit that, executed on the processor, aggregates the number of pages printed for each group of users based on the user change historical data and each job log, wherein, before a user changes a group of users from a previous group to a new group, the control unit aggregates the number of the pages printed as a usage of the user belonging to the previous group, and wherein, after the user changes the group of users from the previous group to the new group, the control unit aggregates the number of the pages printed as a usage of the user belonging to the new group.

3. The job log processing apparatus according to claim 1, wherein the record creation unit creates the user change historical data with respect to each of job logs executed under a previous date, and the control unit controls the update unit so that the update unit updates the group of users based on change information when the date of the change of the group of users has come and the record creation unit has acquired the group of users with respect to each of the job logs having been executed under the previous date.

4. The job log processing apparatus according to claim 1, wherein the record creation unit acquires the group of users when the group of users to which the user indicated by the user identifier contained in each of the job logs belonged at the time of execution of the job is different from the group of users referred to at a last time.

5. The job log processing apparatus according to claim 1, wherein the section information storage unit further stores information of upper groups of users to which groups of users directly belong respectively, and the association unit creates date-based group aggregation records each including the date, information of identification of the group of users and the aggregation value by aggregating the number of pages printed of the job logs in accordance with each date and each group of users, creates group change history records each including the identifier of the group of users, the date and the information of an upper group of users to which the group of users belongs, in accordance with each of the date-based group aggregation records, and creates an aggregation value of each group of users by accumulating aggregation values of the date-based group aggregation records in accordance with the upper groups of users to which the groups of users belong respectively based on the group change history records.

6. The job log processing apparatus according to claim 2, wherein the record creation unit creates the user change historical data with respect to each of job logs executed under a previous date, and the control unit controls the update unit so that the update unit updates the group of users based on change information when the date of the change of the group of users has come and the record creation unit has acquired the group of users with respect to each of the job logs having been executed under the previous date.

7. The job log processing apparatus according to claim 2, wherein the record creation unit acquires the group of users when the group of users to which the user indicated by the user identifier contained in each of the job logs belonged at the time of execution of the job is different from the group of users referred to at a last time.

8. The job log processing apparatus according to claim 2, wherein the section information storage unit further stores information of upper groups of users to which groups of users directly belong respectively, and the association unit creates date-based group aggregation records each including the date, information of identification of the group of users and the aggregation value by aggregating the number of pages printed of the job logs in accordance with each date and each group of users, creates group change history records each including the identifier of the group of users, the date and the information of an upper group of users to which the group of users belongs, in accordance with each of the date-based group aggregation records, and creates an aggregation value of each group of users by accumulating aggregation values of the date-based group aggregation records in accordance with the upper groups of users to which the groups of users belong respectively based on the group change history records.

9. A computer readable medium storing a program causing a computer to execute a process for job log processing, the process comprising:
   (a) collecting job logs, inclusive of information of identification of users having requested jobs, time of execution of each job, and a number of pages printed, from execution devices by which the jobs have been executed;
   (b) storing the collected job logs;
   (c) storing information of a group of users to which the users belong respectively;
   (d) updating the information of the group of users stored in the step (c) based on the information of the group of users based on change information indicating a change of the group of users to which the user belongs to create user change historical data, the user change historical data indicating a date of the change of the group of users and the change of the group of the users;
   (e) extracting a user identifier from each of job logs stored in the step (b);
   (f) acquiring the information of the group of users from the user historical data based on the extracted user identifier;
   (g) creating a user change historical data which includes (i) the user identifier, (ii) the time of execution of the job, and (iii) the information of the group of users indicated by the job log as the group to which the users belong at the time of execution of the job, wherein (i) the user identifier and (ii) the time of execution of the job are extracted from the job log, and
   wherein (iii) the information of the group of users indicating the group to which the users belong at the time of execution of the job is acquired based on the information of the group of users and the job log,
   (h) associating the number of pages printed of the job log with the group of users based on the group of users acquired from the user change historical data with respect to each job log; and
   (i) aggregating the number of pages printed for each group of users based on the user change historical data and each job log and controlling the updating so that the change information concerned with the change of the group that is older than the time of execution of the job indicated by the job log as each base of the user change historical data is not reflected in the step (c) before the user change historical data is created,
   wherein, before a user changes a group of users from a previous group to a new group, the aggregating aggregates the number of the pages printed as a usage of the user belonging to the previous group, and
   wherein, after the user changes the group of users from the previous group to the new group, the aggregating aggregates the number of the pages printed as a usage of the user belonging to the new group.

10. The job log processing apparatus according to claim 1, wherein the control unit controls the update unit so that the change information concerned with the change of the group that is older than the time of execution of the job indicated by the job log as each base of the user change historical data is not reflected in the section information storage unit before the user change historical data is created.

11. The job log processing apparatus according to claim 2, wherein the control unit controls the update unit so that the change information concerned with the change of the group that is older than the time of execution of the job indicated by the job log as each base of the user change historical data is allowed to be reflected in the section information storage unit after the user change historical data is created.

12. The computer readable medium according to claim 9, wherein the process further comprises controlling the updating so that the change information concerned with the change of the group that is older than the time of execution of the job indicated by the job log as each base of the user change historical data is not reflected in the step (c) before the user change historical data is created.

13. The job log processing apparatus according to claim 1, wherein the change historical data creation unit, executed on the processor, creates the change historical data day by day.

14. The job log processing apparatus according to claim 2, wherein the change historical data creation unit, executed on the processor, creates the change historical data day by day.

15. The computer readable medium according to claim 9, wherein the change historical data creation unit, executed on the processor, creates the change historical data day by day.

* * * * *